(12) United States Patent
Shi et al.

(10) Patent No.: US 9,713,870 B2
(45) Date of Patent: Jul. 25, 2017

(54) SYSTEM AND METHOD FOR LOCATING VEHICLE COMPONENTS RELATIVE TO EACH OTHER

(71) Applicant: GM GLOBAL TECHNOLOGY OPERATIONS LLC, Detroit, MI (US)

(72) Inventors: Jianying Shi, Oakland Township, MI (US); John Patrick Spicer, Plymouth, MI (US); Lance T. Ransom, Essex (CA)

(73) Assignee: GM Global Technology Operations LLC, Detroit, MI (US)

( * ) Notice: Subject to any disclaimer, the term of this patent is extended or adjusted under 35 U.S.C. 154(b) by 30 days.

(21) Appl. No.: 14/716,158

(22) Filed: May 19, 2015

(65) Prior Publication Data

US 2015/0343640 A1 Dec. 3, 2015

Related U.S. Application Data

(60) Provisional application No. 62/005,553, filed on May 30, 2014.

(51) Int. Cl.
   *G06K 9/00* (2006.01)
   *B25J 9/16* (2006.01)
   *G06T 1/00* (2006.01)

(52) U.S. Cl.
   CPC ............ *B25J 9/1697* (2013.01); *B25J 9/1687* (2013.01); *G06K 9/0063* (2013.01);
   (Continued)

(58) Field of Classification Search
   CPC ..... B25J 9/1687; B25J 9/1697; G06K 9/0063; G06T 1/0014; G06T 2207/10016;
   (Continued)

(56) References Cited

U.S. PATENT DOCUMENTS

5,219,264 A * 6/1993 McClure .................. B25J 5/007
                                                          414/730
6,167,607 B1 * 1/2001 Pryor ................... A01B 69/008
                                                          29/407.04
(Continued)

FOREIGN PATENT DOCUMENTS

CN        101909828 A      12/2010
CN        101913076 A      12/2010
(Continued)

*Primary Examiner* — Utpal Shah
*Assistant Examiner* — Ian Lemieux
(74) *Attorney, Agent, or Firm* — Quinn IP Law

(57) ABSTRACT

A method for locating a first vehicle component relative to a second vehicle component includes the following steps: (a) moving the robotic arm to a first position such that a form feature of the first vehicle component is within a field of view of a camera; (b) capturing an image the form feature of the first vehicle component; (c) moving the robotic arm to a second position such that the form feature of the second vehicle component is within the field of view of the camera; (d) capturing an image of the form feature of the second vehicle component; (e) picking up the second vehicle component using the robotic arm; and (f) moving the robotic arm along with the second vehicle component toward the first vehicle component.

20 Claims, 7 Drawing Sheets

(52) U.S. Cl.
CPC .. *G06T 1/0014* (2013.01); *G05B 2219/40003* (2013.01); *G05B 2219/40033* (2013.01); *G06T 2207/10016* (2013.01); *G06T 2207/10028* (2013.01); *Y10S 901/09* (2013.01)

(58) Field of Classification Search
CPC ......... G06T 2207/10028; G06T 7/0065; G06T 7/204; Y10S 901/09
See application file for complete search history.

(56) References Cited

U.S. PATENT DOCUMENTS

2011/0087360 A1* 4/2011 Chen ................ B25J 9/1697
  700/114
2015/0323922 A1* 11/2015 Fletcher ............. G05B 19/19
  700/160

FOREIGN PATENT DOCUMENTS

| CN | 103624554 A | 3/2014 |
| CN | 103722549 A | 4/2014 |

\* cited by examiner

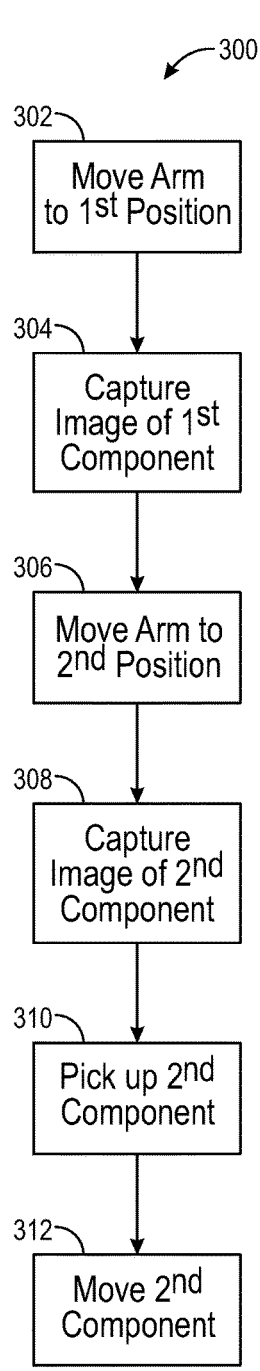
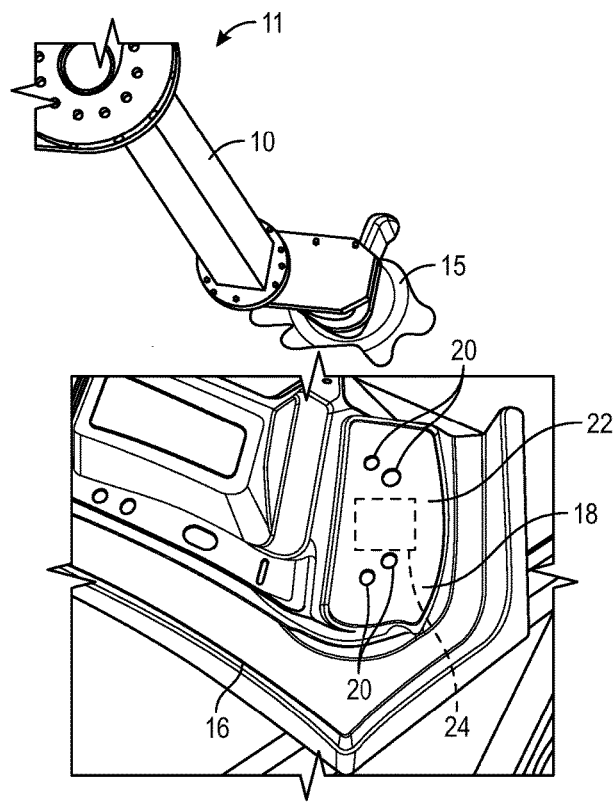
FIG. 5
FIG. 4
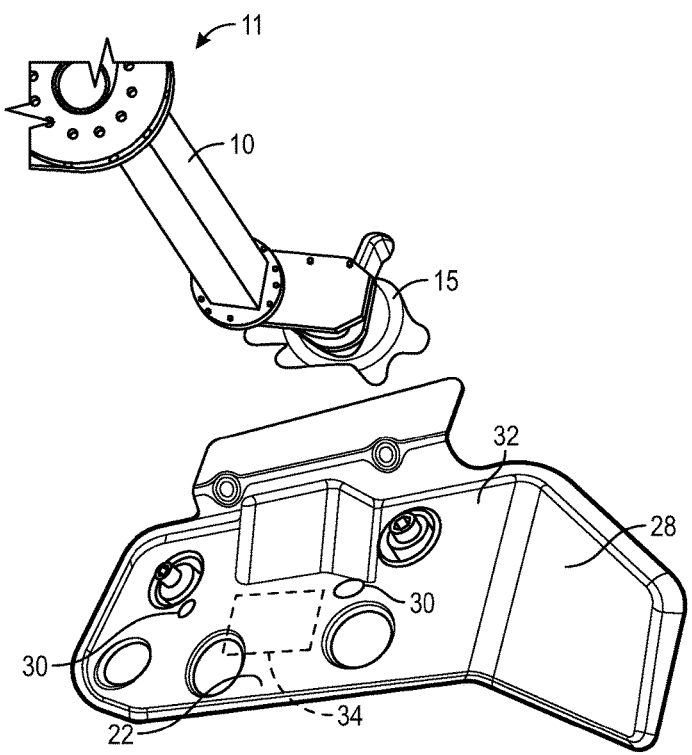
FIG. 6

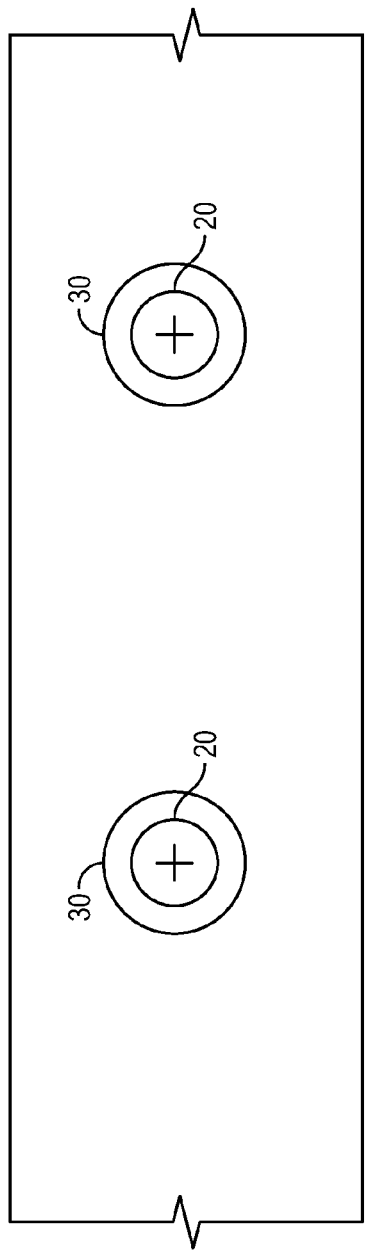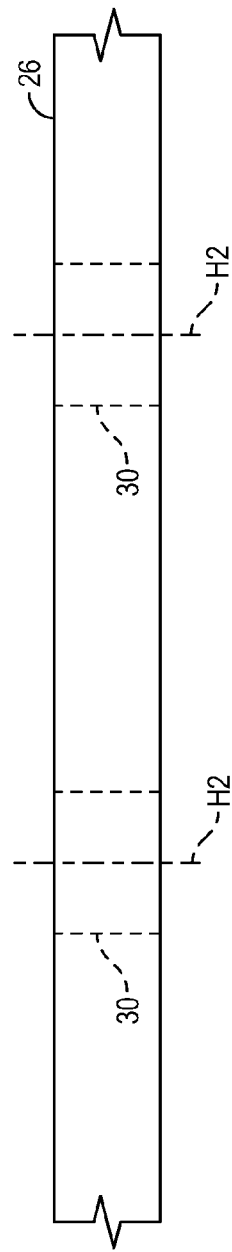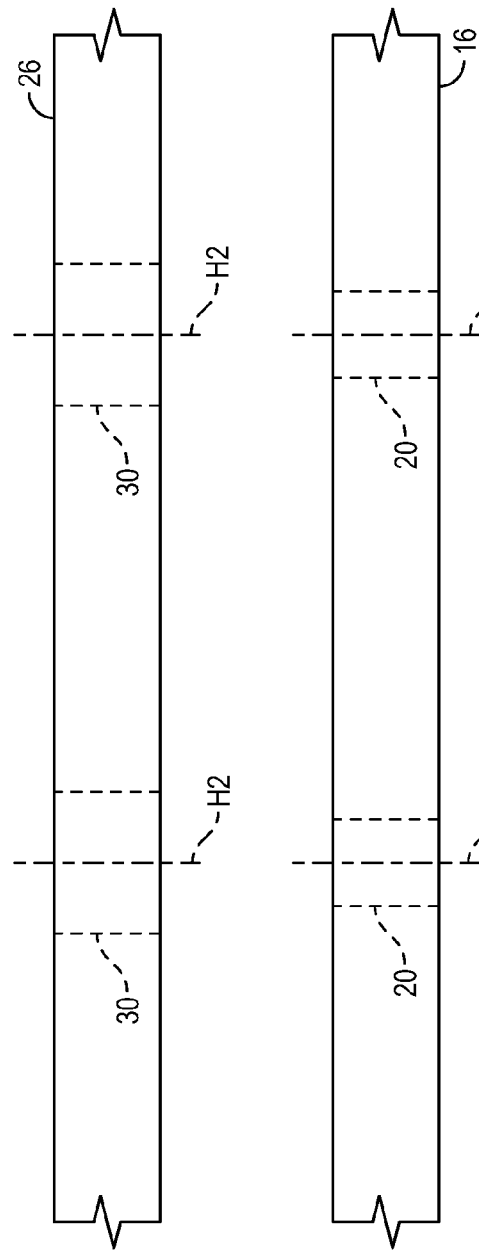
FIG. 12
FIG. 13

SYSTEM AND METHOD FOR LOCATING VEHICLE COMPONENTS RELATIVE TO EACH OTHER

CROSS-REFERENCE TO RELATED APPLICATIONS

This application claims the benefit of U.S. Provisional Application No. 62/005,553, filed May 30, 2014, which is hereby incorporated by reference in its entirety.

TECHNICAL FIELD

The present disclosure relates to a system and method for locating vehicle components relative to each other.

BACKGROUND

Vehicle bodies are comprised of a multitude of structural components that must be assembled to one another with sufficient precision for proper function and aesthetics. The body includes multiple subassemblies each having a number of subcomponents. Typically, dedicated fixtures are designed for presenting and positioning each subcomponent relative to one or more subcomponents to which it is to be assembled. These fixtures require an extended lead time and significant capital investment to design and manufacture prior to use in assembling the body components. Any changes in subcomponent parts may require a new fixture or substantial change to existing fixtures if feasible. Additionally, the fixtures occupy a large amount of floor space.

SUMMARY

It is useful to assemble vehicle components together without using fixtures. To this end, the present disclosure describes a method for locating a first vehicle component relative to a second vehicle component independently of the absolute position of either the first vehicle component or the second vehicle component, and without requiring the use of precision locating hardware elements (e.g. locating pins) in a fixture. The first vehicle component includes a first component body and defines at least one form feature disposed on the first component body. In the present disclosure, the term "form feature" means a physical, tangible structure (or representation thereof) in a component, such as vehicle component, that has particular geometric and/or topographic characteristics. As non-limiting examples, the form features may be holes, protruding bosses, triangular structures, corners, slots, edges, or a combination thereof. Because the form features in the components are used to locate two or more parts relative to each other, the form features may alternative be referred to as "locating features." Also, because the form features may have a unique geometry relative to the rest of the part, the form features may alternative be referred to as geometric features. The second vehicle component includes a second component body and defines at least one form feature on the second component body. In an embodiment, the method employs a robotic arm and a camera coupled to the robotic arm and includes the following steps: (a) moving the robotic arm to a first position such that the form feature of the first vehicle component is within a field of view of the camera; (b) capturing an image of the form feature of the first vehicle component using the camera in order to locate the form feature of the first vehicle component relative to the first component body; (c) moving the robotic arm to a second position such that the form feature of the second vehicle component is within the field of view of the camera; (d) capturing an image of the form feature of the second vehicle component using the camera in order to locate the form feature of the second vehicle component relative to the second component body; (e) picking up the second vehicle component using an end-of-arm-tool (EOAT) on the robotic arm; and (f) moving the robotic arm along with the second vehicle component toward the first vehicle component in order to substantially align the form feature of the first vehicle component with the form feature of the second vehicle component so as to locate the second vehicle component in a predetermined position relative to the first vehicle component independently of an absolute position of the first vehicle component. By using the method described above, the first vehicle component can be placed in a predetermined position relative to the second vehicle component without using locating pins and dedicated fixtures for the vehicle component. The first vehicle component is placed onto a part support or onto EOAT that is held by a second robot.

The present disclosure also relates to a system for locating the first vehicle component relative to the second vehicle component. The system includes the robotic arm and the camera mentioned above. In addition, the system includes a control module programmed to command the robotic arm and the camera to perform the steps of the method described above. The present disclosure also relates to a manufacturing arrangement that includes the system, the first vehicle component, and the second vehicle component described above.

The cameras can also be coupled to a gripper of the robotic arm. In this embodiment, the cameras can capture an image of the first and second vehicle components simultaneously in order to locate the locating form features of both the first and second vehicle components.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 4 is a flowchart of a method for locating vehicle components relative to each other;

FIG. 5 is a schematic perspective view of a robotic arm in a first position relative to the first vehicle component;

FIG. 6 is a schematic perspective view of the robotic arm in a second position relative to the second vehicle component;

FIG. 12 is a schematic top view of a second vehicle component placed over a first vehicle component, showing that the locating form features of the second vehicle component are larger than the locating form features of the first vehicle component; and FIG. 13 is a schematic side view of the vehicle components shown in FIG. 12, showing that the locating form features of the second vehicle component are larger than the locating form features of the first vehicle component.

DETAILED DESCRIPTION

Figure 1A:
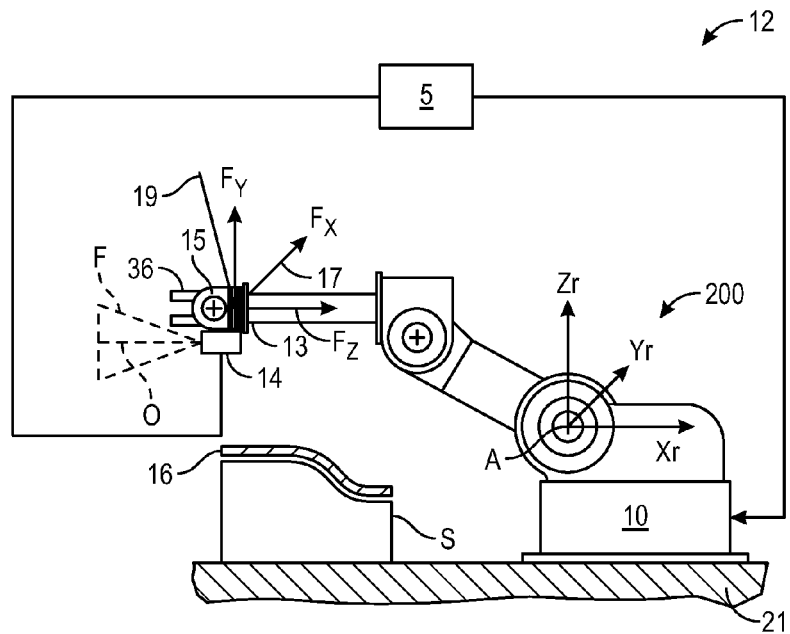
FIG. 1A is a schematic side view of a system for assembling vehicle components.

Referring to the drawings, wherein like reference numbers refer to like components throughout the views, FIG. 1A schematically illustrates an articulable robotic arm 10 mounted on a base 21. The articulable robotic arm 10 includes an arm body 13 and an end-of-arm-tool 15 (EOAT) coupled to a free end 17 of the arm body 13. In the present disclosure, the term "EOAT" refers to a tool disposed at an end of the robotic arm 10 that is capable of performing work on a workpiece. The EOAT 15 can be directly attached to the free end 17 of the arm body 13. In the depicted embodiment, the EOAT 15 can pick and place a workpiece, such as a vehicle component. Aside from holding the workpiece, the EOAT 15 can perform other functions, such as drilling and welding.

The robotic arm 10 is part of a system 12 for assembling vehicle components. The system 12 further includes a control module 5 in communication with the robotic arm 10. The terms "control module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables. The control module 5 is specifically programmed to execute the steps of the method 300 (FIG. 4). In the present disclosure, the control module 5 includes at least one processor and at least one associated memory and can receive data from the robotic arm 10. The control module 5 can control the robotic arm 10 to place the EOAT 15 at a predetermined location and configuration. For example, the control module 5 can command the EOAT 15 to shift between a pick position and a place position. In the pick position, the EOAT 15 can pick a workpiece and, in the place position, the EOAT 15 can place the workpiece. As discussed above, the EOAT 15 can shift between the picking position and place position based on commands received from the control module 5.

The control module 5 can also control the movement of the robotic arm 10. The robotic arm 10 can move linearly and rotationally in order to change the position of the EOAT 15 within a spatial three-dimensional coordinate system 200. The spatial three-dimensional coordinate system 200 has a point of origin A defined with respect to the robotic arm 10 and includes an x-axis (Xr), a y-axis (Yr), and a z-axis (Zr). The control module 5 can store data relating to the spatial three-dimensional coordinate system 200 in order to control the movement of the robotic arm 10.

Figure 1B:
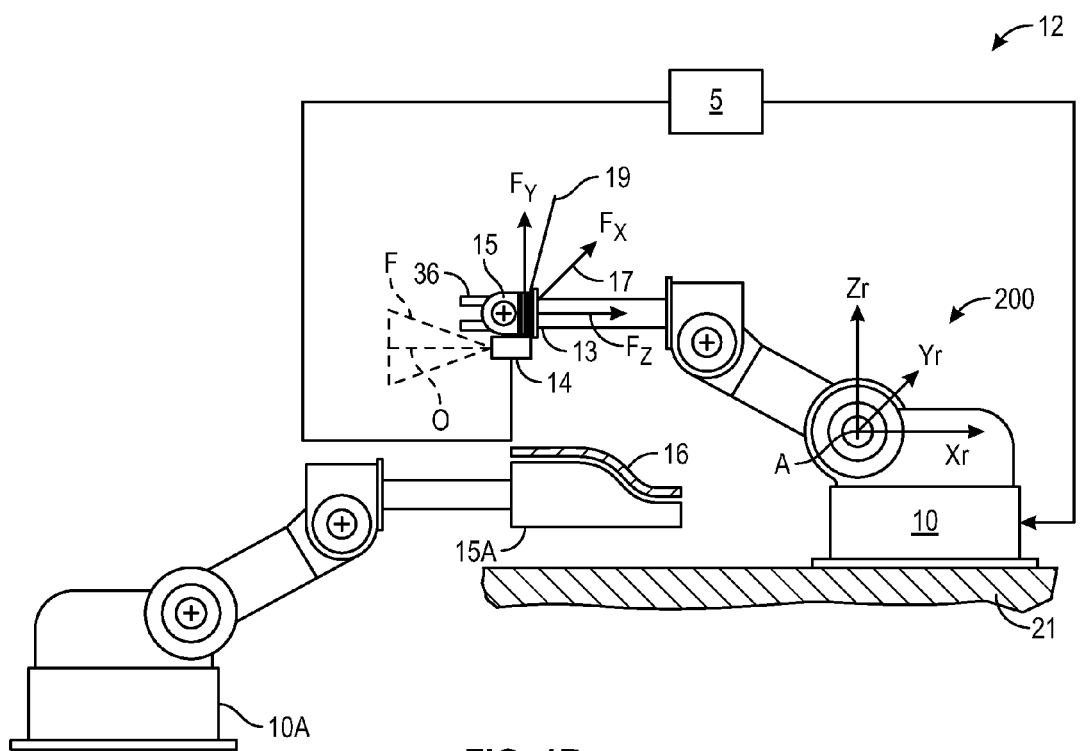
FIG. 1B is a schematic side view of a system for assembling vehicle components in accordance with another embodiment of the present disclosure.

The system 12 additionally includes at least one of 2D or 3D camera 14 in communication with the control module 5. The camera 14 can capture 2D or 3D images within a field of view F. Moreover, the camera 14 can be a 2D or 3D camera and defines an optical axis O extending along the field of view F. In the depicted embodiment, the field of view F is symmetrical along the optical axis O. Moreover, the camera 14 is in communication with the control module 5 and can therefore send input signals and data (e.g., images) to the control module 5. The control module 5 can receive the input signals and data (e.g., images) from the camera 14 in order to identify and locate features of a workpiece. In the depicted embodiment, the camera 14 is directly coupled to the EOAT 15. However, the camera 14 may be coupled to another part of the robotic arm 10 or another part of the system 12. It is also contemplated that the system 12 may include more than one camera 14. The system 12 includes either a part support S for supporting the first vehicle component 16 (e.g. body panel) or a second robot 10A with EOAT 15A for holding the first part as shown in FIG. 1B. The system 12 may also include an illumination system (not shown) for the cameras 14. The robot 10 may include a force sensor 19 near the gripper 36 in order to monitor the force when placing the second vehicle component 26 onto the first vehicle component 16 in different directions Fy, Fx, etc. The first vehicle component 16 is placed onto a part support S or onto EOAT 15A that is held by a second robot 10A.

Figure 2:
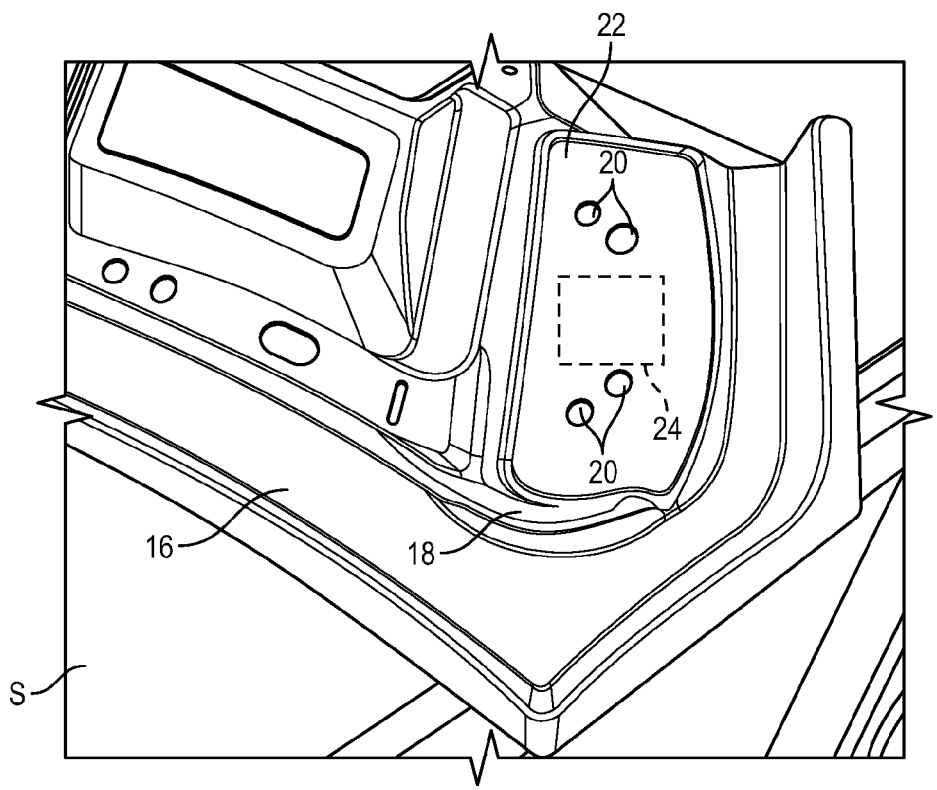
FIG. 2 is a schematic perspective view of a first vehicle component defining a plurality of form features.

FIG. 2 schematically illustrates a first vehicle component 16. The first vehicle component 16 may be a body panel and includes a first component body 18 and at least one form feature 20 disposed on the first component body 18. In the depicted embodiment, the form feature 20 is a hole extending through the first component body 18. The form features 20 of the first vehicle components 16 may be referred to as the first form features. In the depicted embodiment, the first vehicle component 16 defines a plurality of form features 20 on the first component body 18.

The first component body 18 includes a first substantially planar mating surface 22 extending along a first plane 24. In the depicted embodiment, all the form features 20 are holes extending through the first substantially planar panel 22 and disposed along the first plane 24. It is useful to place all the form features 20 along the first plane 24 to help the camera 14 locate the form features 20.

Figure 3:
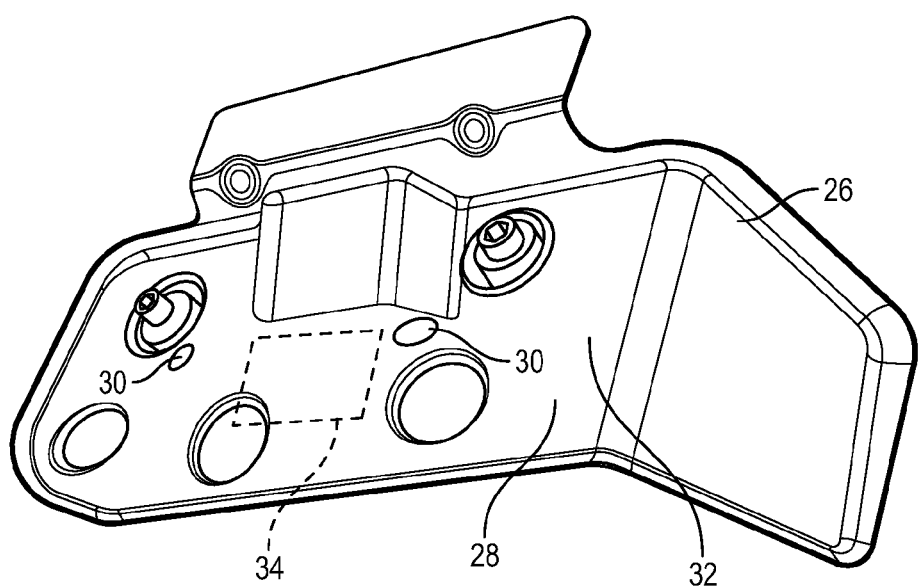
FIG. 3 is a schematic perspective view of a second vehicle component defining a plurality of form features.

FIG. 3 schematically illustrates a second vehicle component 26 configured, shaped, and sized to be coupled to the first vehicle component 16. The second vehicle component 26 may be a bracket and includes a second component body 28 and at least one form feature 30 disposed on the second component body 28. In the depicted embodiment, the form feature 30 is a hole extending through the second component body 28. The second vehicle component 26 may define a plurality of form features 30 on the second component body 28.

The second component body 28 includes a second substantially planar mating surface 32 extending along a second plane 34. In the depicted embodiment, all the form features 30 are holes extending through the second substantially planar mating surface 32 and disposed along the second plane 34. It is useful to place all the form features 30 along the second plane 34 to help the camera 14 locate the form features 30. Because the form features 20, 30 help the system 12 to locate the first vehicle component 16 relative to the second vehicle component 26, the form features 20, 30 may be referred to as locating features. It is also contemplated that the form features 20, 30 may be replaced or supplemented with other geometric features capable of being identified by the camera 14. As non-limiting examples, these geometric features may be holes having other than a circular shape (e.g. rectangular, ellipse, star, slots, lines, etc.), recesses, or protrusions. Accordingly, the references numbers identifying the form features 20, 30 may additionally or alternatively identify geometric features capable of being detected by the camera 14. The camera 14, the robotic arm 10, the first vehicle component 16, and the second vehicle component 26 are collectively referred to as a manufacturing arrangement 11 (FIGS. 5 and 6).

FIG. 4 is a flowchart of a method 300 for locating the first and second vehicle components 16, 26 relative to each other independently of the absolute position of the first vehicle component 16 and/or the second vehicle component 26. The absolute position of the first vehicle component 16 and/or the second vehicle component 26 may be defined relative to the spatial three-dimensional coordinate system 200. The method 300 begins with step 302, which entails moving the robotic arm 10 to a first position, as shown in FIG. 5, in which the form features 20 of the first vehicle component 16 are within the field of view F (FIG. 1A) of the camera 14. In doing so, the control module 5 can command the robotic arm 10 to move toward the first vehicle component 16 until the camera 14 is capable of capturing an image of the form features 20 of the first vehicle component 16. For example, in step 302, the robotic arm 10 can be moved toward the first vehicle component 16 until the control module 5 determines that the camera 14 is located in a position (i.e., the first position) in which its optical axis O (FIG. 1A) is substantially perpendicular to the first substantially planar mating surface 22 and the first plane 24. Placing the optical axis O (FIG. 1A) substantially perpendicular to the first substantially planar mating surface 22 and the first plane 24 facilitates accurate identification of the form features 20 with the camera 14. Once the robotic arm 10 reaches the first position (FIG. 5), the control module 5 commands the robotic arm 10 to stop moving. In response to this command, the robotic arm 10 stops and remains stationary relative to the first vehicle component 16. The method 300 then continues to step 304.

Step 304 entails capturing at least one image of the first vehicle component 16 using the camera 14 in order to locate the form features 20 of the first vehicle component 16 relative to the first component body 18. In step 304, the control module 5 can command the camera 14 to capture an image of the first vehicle component 16 once the robotic arm 10 has reached the first position (FIG. 5). The camera 14 captures the image of the first vehicle component 16 in response to the command from the control module 5 and sends the image of the first vehicle component 16 to the control module 5. The control module 5 then receives the image from the camera 14 and determines the location of the form features 20 with respect to the first component body 18. The method 300 may then proceed to step 306.

Step 306 entails moving the robotic arm 10 to a second position, as shown in FIG. 6, in which the form features 30 of the second vehicle component 26 are within the field of view F (FIG. 1A) of the camera 14. In doing so, the control module 5 can command the robotic arm 10 to move toward the second vehicle component 26 until the camera 14 is capable of capturing an image of the form features 30 of the second vehicle component 26. For instance, in step 306, the robotic arm 10 can be moved toward the second vehicle component 26 until the control module 5 determines that the camera 14 is located in a position (i.e., the second position) in which its optical axis O (FIG. 1A) is substantially perpendicular to the second substantially planar mating surface 32. Placing the optical axis O (FIG. 1A) substantially perpendicular to the second substantially planar mating surface 32 facilitates accurate identification of the form features 30 with the camera 14. Once the robotic arm 10 reaches the second position (FIG. 6), the control module 5 commands the robotic arm 10 to stop moving. In response to this command, the robotic arm 10 stops and remains stationary relative to the second vehicle component 26. The method 300 then continues to step 308

Step 308 entails capturing at least one image of the second vehicle component 26 using the camera 14 in order to locate the form features 30 of the second vehicle component 26 relative to the second component body 28. In step 308, the control module 5 can command the camera 14 to capture an image of the second vehicle component 26 once the robotic arm 10 has reached the second position (FIG. 6). The camera 14 captures the image of the second vehicle component 26 in response to the command from the control module 5 and sends the image of the second vehicle component 26 to the control module 5. The control module 5 then receives the image from the camera 14 and determines the location of the form features 30 with respect to the second component body 28. Steps 306 and 308 can be performed before or after performing steps 302 and 304. After performing steps 302, 304, 306, and 308, the method 300 proceeds to step 310.

Step 310 entails picking up the second vehicle component 26 using the EOAT 15 of the robotic arm 10. To do so, the control module 5 can command the robotic arm 10 to move toward the second vehicle component 26 while the EOAT 15 is empty (without a part). Once the EOAT 15 is adjacent the second vehicle component 26, the control module 5 commands the EOAT 15 of the robotic arm 10 to pick up the second vehicle component 26. Alternatively, step 310 may entail picking up the first vehicle component 16 using the EOAT 15 of the robotic arm 10. Next, the method 300 continues to step 312. In the present disclosure, the term "picking up" a component, such as a vehicle component, means grasping that component and may additionally include lifting the component.

Figure 7:
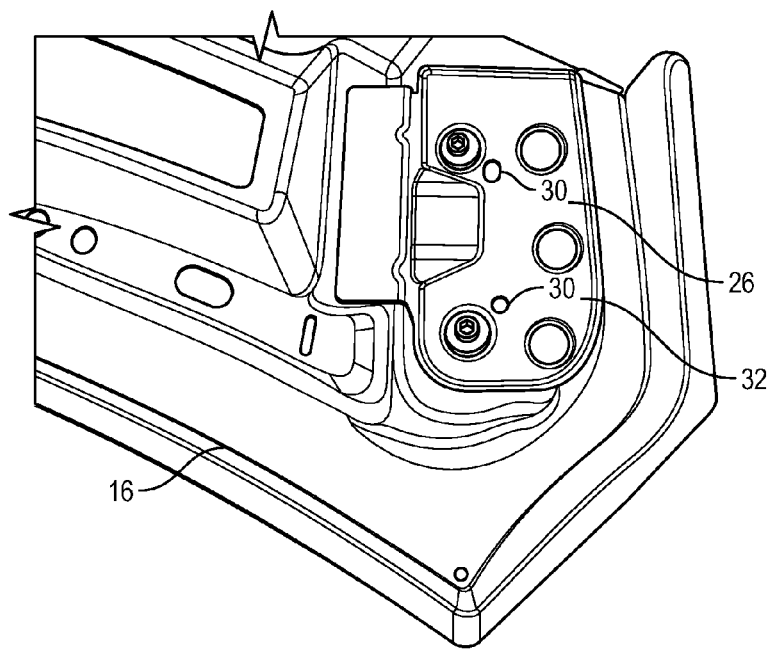
FIG. 7 is a schematic perspective view of the second vehicle component placed on the first vehicle component such that the form features of the first vehicle component are substantially aligned with the form features of the second vehicle component.

Step 312 entails moving the second vehicle component 26 that is being held by the EOAT 15 in order to place the second vehicle component 26 on the first vehicle component 16 such that each form feature 30 of the second vehicle component 26 is substantially aligned with a respective form feature 20 of the first vehicle component 16 as shown in FIG. 7. To move the robotic arm 10, the control module 5 commands the robotic arm 10 to move toward the first vehicle component 16. At this juncture, the first vehicle component 16 is stationary relative to the robotic arm 10 and may be supported by any suitable structure, such as a part support S, EOAT 15A of a second robot 10A, or table, that is able to prevent the first vehicle component 16 from shifting during the assembly process. The control module 5 also commands the robotic arm 10 to continue moving until each form feature 30 of the second vehicle component 26 is substantially aligned with a respective form feature 20 of the first vehicle component 16. The control module 5 can determine the final destination of the second vehicle component 26 (i.e., the predetermined position) based, at least in part, on the captured images of the form features 20, 30 of the first and second vehicle components 16, 26, respectively. In other words, because the control module 5 has already determined the location of the form features 20, 30 of the first and second vehicle components 16, 26, respectively, it can command the robotic arm 10 to move the second vehicle component 26 to a position in which the form features 20 are substantially aligned with the form features 30. Once each form feature 30 of the second vehicle component 26 is substantially aligned with each form feature 20 of the first vehicle component 16, the control module 5 commands the robotic arm 10 to stop moving. In response, the robotic arm 10 stops moving. In step 312, the control module 5 can determine the final destination of the second vehicle component 26 in real time or before the initiating step 312. After the robotic arm 10 stops moving, the control module 5 commands the EOAT 15 to place the second vehicle component 26. After locating the first vehicle component 16 in relation to the second vehicle component 26 in a predetermined position, the first and second vehicle components 16, 26 may be welded together or joined using any other suitable process.

Figure 8:
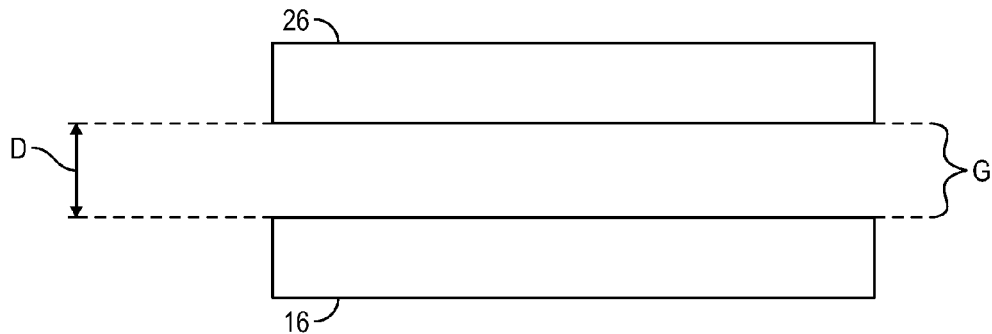
FIG. 8 is a schematic front view of the first and second vehicle components, wherein the first vehicle component is spaced from the second vehicle component by a predetermined standoff distance.

With reference to FIG. 8, in order to enhance the quality of the weld joint, it may be useful to maintain the first vehicle component 16 separate from the second vehicle component 26 by a predetermined standoff distance D. The predetermined standoff distance D depends on the materials of the first vehicle component 16 and the second vehicle component 26. Because the first and second vehicle components 16, 26 are spaced apart from each other by the predetermined standoff distance D, a gap G is defined between the first and second vehicle components 16, 26. Accordingly, the control module 5 can be programmed to command the robotic arm 10 to move toward the second vehicle component 26 until the first vehicle component 16 is spaced from the second vehicle component 26 by the predetermined standoff distance D. This position can be determined by comparison of the X,Y,Z coordinates of the locating form features 20, 30 in each of the two component parts 16, 26. Alternatively, the standoff distance D can be achieved by employing a force sensor 19 in the robot arm 10. The vehicle components 16, 26 are brought together until the force of contact is detected by the force sensor 19. Then the robot 10 can back the second vehicle component 26 away from the first vehicle component 16 by the predetermined standoff distance D. In response, the robotic arm 10 moves along with the second vehicle component 26 toward the first vehicle component 16 until the second vehicle component 26 is spaced from the first vehicle component 16 the predetermined standoff distance D.

Figure 9:
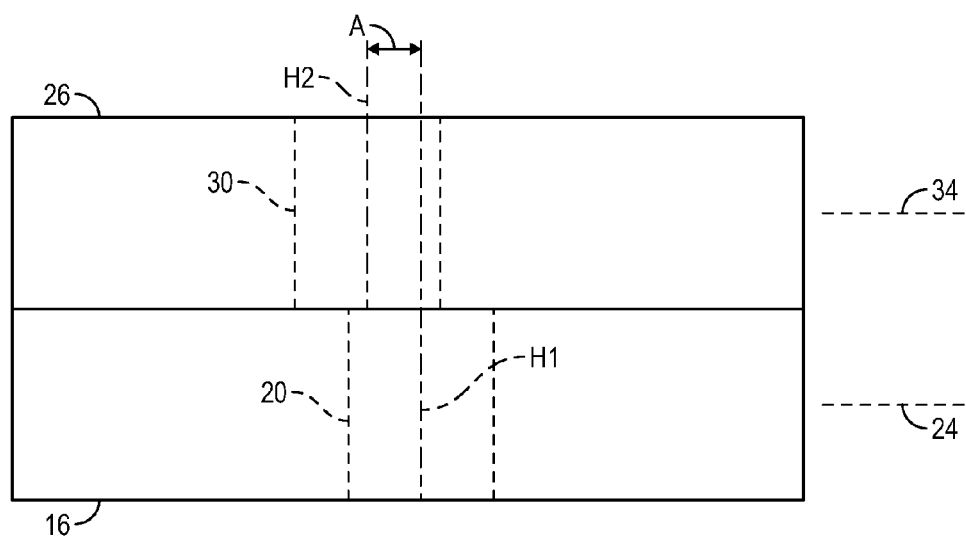
FIG. 9 is a schematic front view of the first and second vehicle components, wherein a form feature of the first vehicle component is offset relative to the form feature of the second vehicle component.

With reference to FIG. 9, the control module 5 can be programmed to position the second vehicle component 26 relative to the first vehicle component 16 such that at least one of the form features 30 of the second vehicle component 26 is offset relative to the one of the form features 20 of the first vehicle component 16 along the first plane 24 or the second plane 34. Thus, a central axis H1 of one form feature 20 of the first vehicle component 16 can be offset relative to a central axis H2 of one form feature 30 of the second vehicle component 26 by an offset distance F. If the control module 5 is programmed to determine the final destination of the second vehicle component 26 in real time, then the robotic arm 10 can be controlled in order to place the second vehicle component 26 such that the form features 30 of the second vehicle component 26 are offset from the form features 20 of the first vehicle component 16 by the predetermined offset distance A. The predetermined offset distance A is zero if the form features 20 of the first vehicle component 16 are not offset from the form features 30 of the second vehicle component 26.

Figure 10:
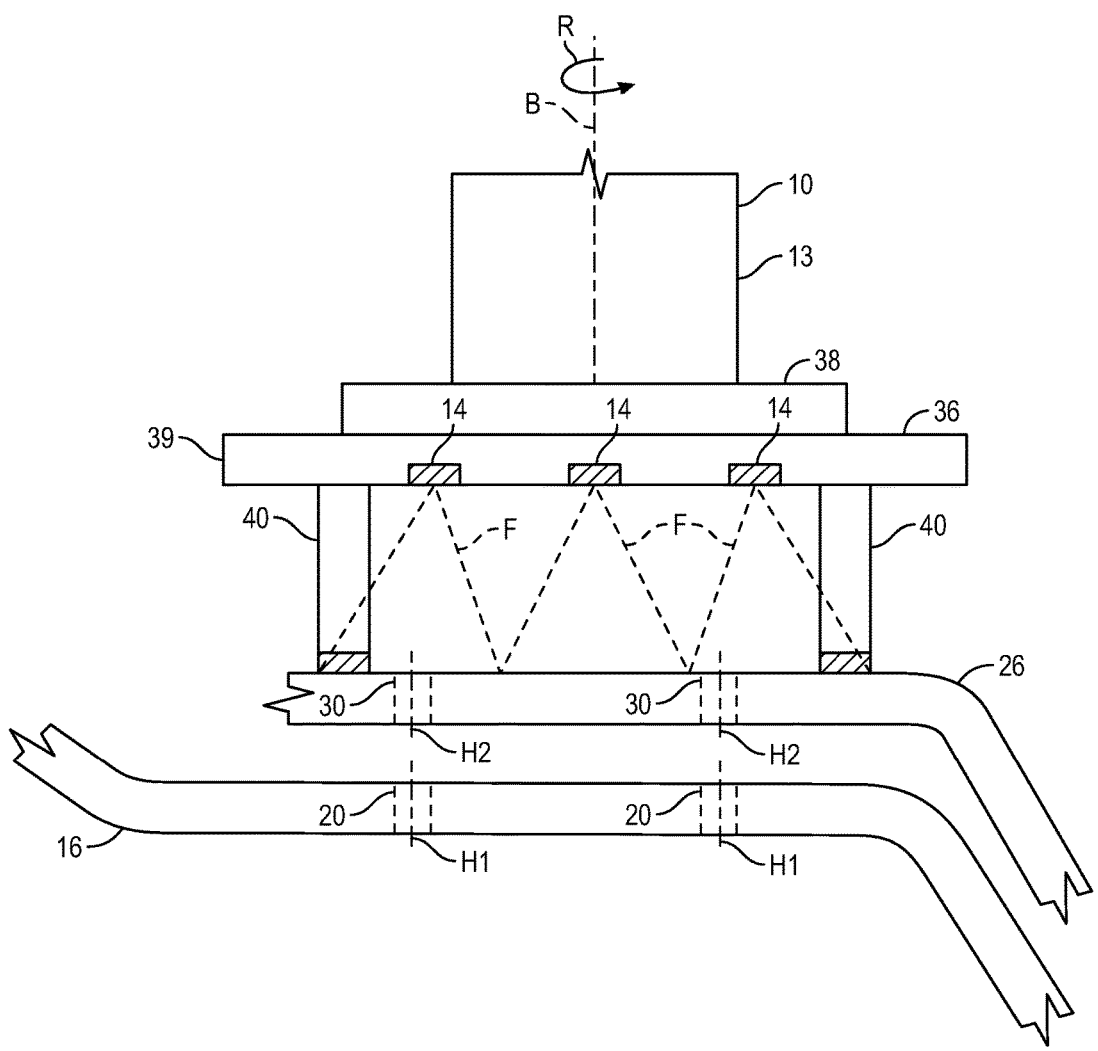
FIG. 10 is a schematic side view of a gripper of a robotic arm holding a second vehicle component that is about to the placed on a first vehicle component.
Figure 11:
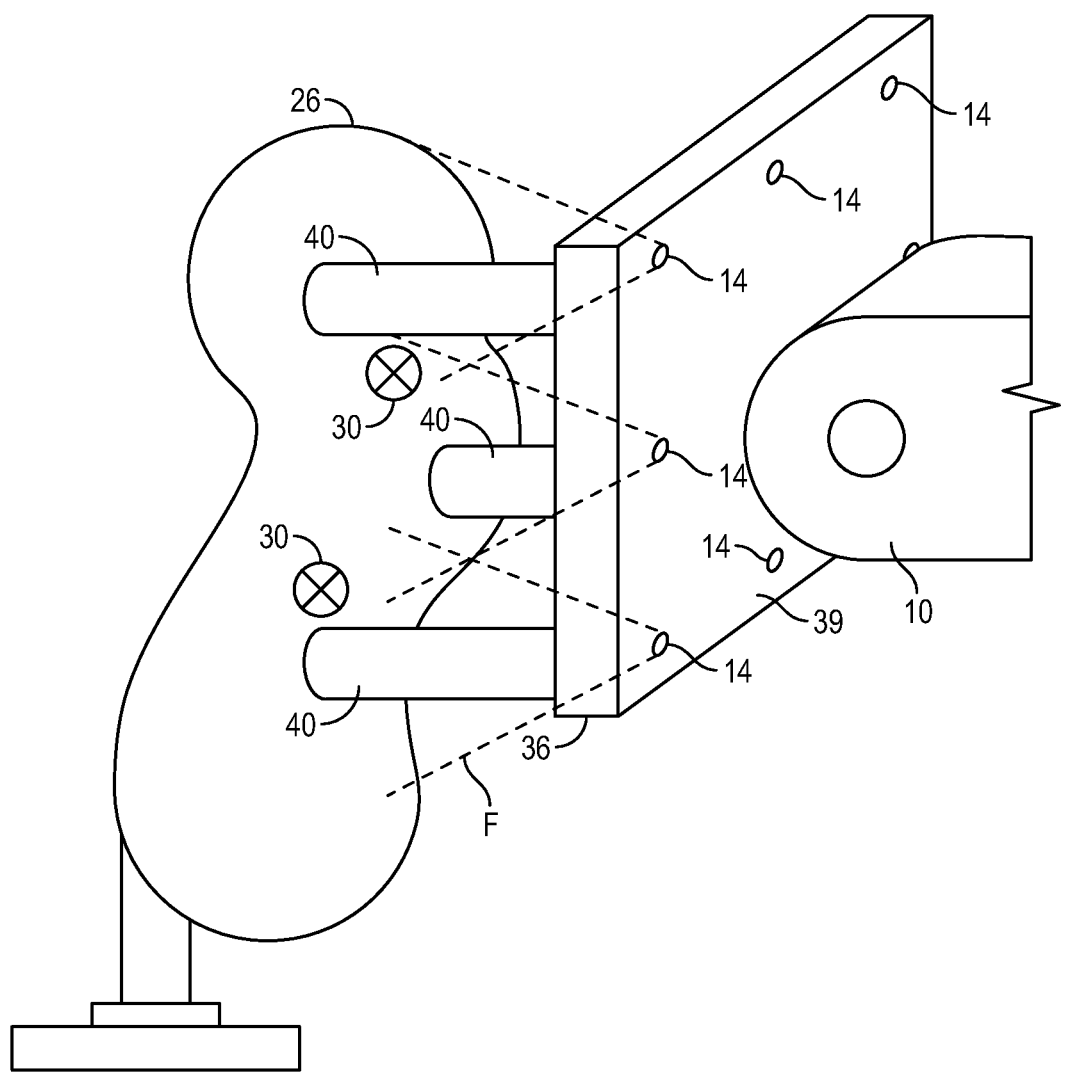
FIG. 11 is a schematic perspective view of the gripper shown in FIG. 10 holding the second vehicle component.

With reference to FIGS. 10 and 11, EOAT 15 of the robotic arm 10 may be configured as a gripper 36 mounted to the arm body 13 through a mounting plate 38. The arm body 13 can rotate about a body axis B in a rotational direction R (or the opposite rotational direction). Rotating the arm body 13 causes the gripper 36 to rotate as well. The gripper 36 includes a base 39 and one or more gripping elements 40 capable of holding the first vehicle component 16 or the second vehicle component 26. The gripping elements 40 can grasp and hold the second vehicle component 26 (or the first vehicle component 16). As non-limiting examples, the gripping elements 40 could be mechanical fingers, suction cups, magnets, or other elements suitable to hold the second vehicle component 26 (or the first vehicle component 16).

In the depicted embodiment, the gripper 36 is shown holding the second vehicle component 26. The cameras 14 are coupled to the gripper 36 between the fingers 40. As shown in FIG. 10, the second vehicle component 26 can be aligned with the first vehicle component 16 while the first vehicle component 16 is resting on an imprecise part support S or being held by a second robot 10A with end-of-arm tooling 15A). The part support S does not need to position the first component 16 precisely, but it must prevent the first vehicle component 16 from moving or shifting when the second vehicle component 26 is being aligned with the first vehicle component 16.

One or more 2D or 3D cameras 14 are mounted in the base 39 of the gripper 36 in order to have a good line of sight to look simultaneously through the locating form features 30 of the second vehicle component 26 and into and through the locating form features 20 of the first vehicle component 16. In other words, the cameras 14 can be mounted in the gripper 36 so that there is more of a direct line of sight from the camera 14 to the locating form features 20, 30 of the first vehicle component 16 and the second vehicle component 26, respectively. This would enable the cameras 14 to see the locating form features 20, 30 in the first vehicle component 10 and the second vehicle component 20 simultaneously.). Although the FIGS. 10 and 11 show one or more cameras 14 coupled to the gripper 36. Enough cameras 14 are included in order to ensure that the locating form features 20, 30 are in view of at least one camera 14, and that the locating form features 20, 30 are being viewed with an appropriate resolution (i.e., pixel size) to ensure accuracy. Optionally, a lighting system (e.g., LED illumination) may be included in the gripper 36 to provide illumination for improved vision of the locating form features 20, 30. A lighting system may also be included behind the first vehicle component 16 for the purpose of illuminating the locating form features 20 of the first vehicle component 16 for improved vision performance.

As shown in FIGS. 12 and 13, the locating form features 20 in the first vehicle component 16 are smaller than the form features 30 in the first vehicle component. This enables the edges of form features 20, 30 of the first and second vehicle components 16, 26 to be seen at the same time when the first and second vehicle components 16, 26 are aligned with each other. Using this approach, misalignment of locating form features 20, 30 can be easily determined. Furthermore, it is contemplated that the cameras 14 do not necessarily have to be mounted on the gripper 36 when using this general approach. This approach could be accomplished with cameras 14 that are mounted underneath the first vehicle component 16 looking first through the locating form features 20 of the first vehicle component 16 and then into and through the locating form features 30 in the second vehicle component 26. In this case, the locating form features 30 in the second vehicle component 26 would need to be smaller than the locating form features 20 in the first vehicle component 16.

While the best modes for carrying out the teachings have been described in detail, those familiar with the art to which this disclosure relates will recognize various alternative designs and embodiments for practicing the teachings within the scope of the appended claims.

The invention claimed is:

1. A method for locating a first vehicle component relative to a second vehicle component using a robotic arm, wherein the first vehicle component includes a first component body and defines at least one first form feature on the first component body, and the second vehicle component includes a second component body and defines at least one second form feature on the second component body, the method comprising:
   moving the robotic arm having a camera coupled thereto to a first position such that the at least one first form feature is within a field of view of the camera;
   capturing at least one image of the at least one first form feature using the camera in order to locate the at least one first form feature relative to the first component body;
   after capturing the at least one image of the at least one first form feature, moving the robotic arm to a second position such that the at least one second form feature of the second vehicle component is within the field of view of the camera;
   capturing at least one image of the at least one second form feature using the camera in order to locate the at least one second form feature relative to the second component body;
   determining a final destination of the second vehicle component based on the at least one image of the at least one first form feature and the at least one image of the second form feature;
   after capturing the at least one image of the first form feature and the at least one image of the second form feature, picking up the second vehicle component using the robotic arm; and
   moving the robotic arm along with the second vehicle component toward the first vehicle component until the second vehicle component reaches the final destination in order to align the at least one first form feature with the at least one second form feature so as to position the second vehicle component in a predetermined position relative to the first vehicle component independently of an absolute position of the first vehicle component.

2. The method of claim 1, wherein moving the robotic arm toward the second vehicle component includes moving the robotic arm until the first vehicle component is spaced from the second vehicle component by a predetermined standoff distance.

3. The method of claim 1, wherein moving the robotic arm toward the second vehicle component includes moving the robotic arm such that the at least one first form feature is offset relative to the at least one second form feature by a predetermined offset distance.

4. The method of claim 1, wherein the at least one first form feature includes a plurality of first form features disposed along a first plane, and capturing the at least one image of the at least one first form feature using the camera includes capturing at least one image of the plurality of first form features.

5. The method of claim 4, wherein the camera defines an optical axis, and moving the robotic arm to the first position includes moving the robotic arm until the optical axis is perpendicular to the first plane.

6. The method of claim 5, wherein at least one second form feature includes a plurality of second form features disposed along a second plane, and capturing the at least one image of the at least one second form feature using the camera includes capturing at least one image of the plurality of second form features.

7. The method of claim 6, wherein moving the robotic arm to the second position includes moving the robotic arm until the optical axis is perpendicular to the second plane.

8. The method of claim 1, wherein the robotic arm defines a spatial three-dimensional coordinate system, and the absolute position of the first vehicle component is defined relative to the spatial three-dimensional coordinate system.

9. A system for locating a first vehicle component relative to a second vehicle component, wherein the first vehicle component includes a first component body and defines at least one first form feature on the first component body, and the second vehicle component includes a second component body and defines at least one second form feature on the second component body, the system comprising:
   a robotic arm including an end-of-arm-tool, wherein the robotic arm defines a spatial three-dimensional coordinate system;
   a camera coupled to the robotic arm, wherein the camera has a field of view and is configured to capture images within the field of view;
   a control module in communication with the camera and the robotic arm, wherein the control module is programmed to:
      command the robotic arm to move to a first position such that the at least one first form feature is within the field of view of the camera;
      command the camera to capture at least one image of the at least one first form feature in order to locate the at least one first form feature relative to the first component body;
      command the robotic arm to move to a second position such that the at least one second form feature of the second vehicle component is within the field of view of the camera after the camera has captured the at least one image of the at least one first form feature;
      command the camera to capture at least one image of the at least one second form feature in order to locate the at least one second form feature relative to the second component body;
      determine a final destination of the of the second vehicle component based on the at least one image of the at least one first form feature and the at least one image of the second form feature;
      command the robotic arm to pick up the second vehicle component using the end-of-arm-tool after the camera has captured the at least one image of the at least one first form feature and the at least one image of the second form feature; and
      command the robotic arm to move, along the second vehicle component, toward the first vehicle component until the second vehicle component reaches the final destination in order to align the at least one first form feature with the at least one second form feature so as to position the second vehicle component in a predetermined position relative to the first vehicle component independently of an absolute position of the first vehicle component, wherein the absolute position of the first vehicle component is defined relative to the spatial three-dimensional coordinate system.

10. The system of claim 9, wherein the control module is programmed to command the robotic arm to move toward the first position until the first vehicle component is spaced from the second vehicle component by a predetermined standoff distance.

11. The system of claim 9, wherein the control module is programmed to command the robotic arm to move toward the second vehicle component such that the at least one first form feature is offset relative to the at least one second form feature by a predetermined offset distance.

12. The system of claim 9, wherein the at least one first form feature includes a plurality of first form features disposed along a first plane, and the control module is programmed to command the camera to capture at least one image of the plurality of first form features.

13. The system of claim 12, wherein the camera defines an optical axis, and the control module is programmed to command the robotic arm to move toward the first position until the optical axis is perpendicular to the first plane.

14. The system of claim 13, wherein the at least one second form feature includes a plurality of second form features disposed along a second plane, and the control module is programmed to command the camera to capture at least one image of the plurality of second form features.

15. The system of claim 14, wherein the control module is programmed to command the robotic arm to move toward the second position until the optical axis is perpendicular to the second plane.

16. A manufacturing arrangement, comprising:
a first vehicle component including a first component body and defining at least one first form feature extending through the first component body;
a second vehicle component including a second component body and defining at least one second form feature extending through the second component body;
a robotic arm including an end-of-arm-tool, wherein the robotic arm defines a spatial three-dimensional coordinate system;
a camera coupled to the robotic arm, wherein the camera has a field of view and is configured to capture images within the field of view; and
a control module in communication with the camera and the robotic arm, wherein the control module is programmed to:
command the robotic arm to move to a first position such that the at least one first form feature is within the field of view of the camera;
command the camera to capture at least one image of the at least one first form feature in order to locate the at least one first form feature relative to the first component body;
command the robotic arm to move to a second position such that the at least one second form feature of the second vehicle component is within the field of view of the camera after the camera has captured the at least one image of the at least one first form feature;
command the camera to capture at least one image of the at least one second form feature in order to locate the at least one second form feature relative to the second component body;
determine a final destination of the of the second vehicle component based on the at least one image of the at least one first form feature and the at least one image of the second form feature;
command the robotic arm to pick up the second vehicle component using the end-of-arm-tool after the camera has captured the at least one image of the at least one first form feature and the at least one image of the second form feature; and
command the robotic arm to move, along with the second vehicle component, toward the first vehicle component until the second vehicle component reaches the final destination in order to align the at least one first form feature with the at least one second form feature so as to locate the second vehicle component in a predetermined position relative to the first vehicle component independently of an absolute position of the first vehicle component, wherein the absolute position of the first vehicle component is defined relative to the spatial three-dimensional coordinate system.

17. The manufacturing arrangement of claim 16, further including at least one of a part support or a second robotic arm having a second end-of-arm-tool, wherein each of the part support and the second end-of-arm-tool are configured to hold at least one of the first and second vehicle component.

18. The manufacturing arrangement of claim 16, wherein the control module is programmed to command the robotic arm to move toward the first position until the first vehicle component is spaced from the second vehicle component by a predetermined standoff distance.

19. The manufacturing arrangement of claim 18, further comprising a force sensor configured to detect contact between the first and second vehicle components, wherein the control module is programmed to back up the second vehicle component by a predetermined standoff distance after the force sensor detects contact between the first and second vehicle components.

20. The manufacturing arrangement of claim 18, wherein the control module is programmed to determine the predetermined standoff distance by comparing X, Y, and Z positions of the location form features in the first and second vehicle components.

* * * * *

UNITED STATES PATENT AND TRADEMARK OFFICE
CERTIFICATE OF CORRECTION

PATENT NO. : 9,713,870 B2
APPLICATION NO. : 14/716158
DATED : July 25, 2017
INVENTOR(S) : Jianying Shi et al.

Page 1 of 1

It is certified that error appears in the above-identified patent and that said Letters Patent is hereby corrected as shown below:

In the Claims

Column 10, Line 54 in Claim 9, "of the of the" should read -of the-.

Signed and Sealed this
Thirty-first Day of October, 2017

Joseph Matal
*Performing the Functions and Duties of the
Under Secretary of Commerce for Intellectual Property and
Director of the United States Patent and Trademark Office*